Aug. 27, 1963     H. L. FLANAGAN     3,101,823
VEHICLE BRAKE OPERATING MEANS
Filed Oct. 31, 1961     2 Sheets-Sheet 1
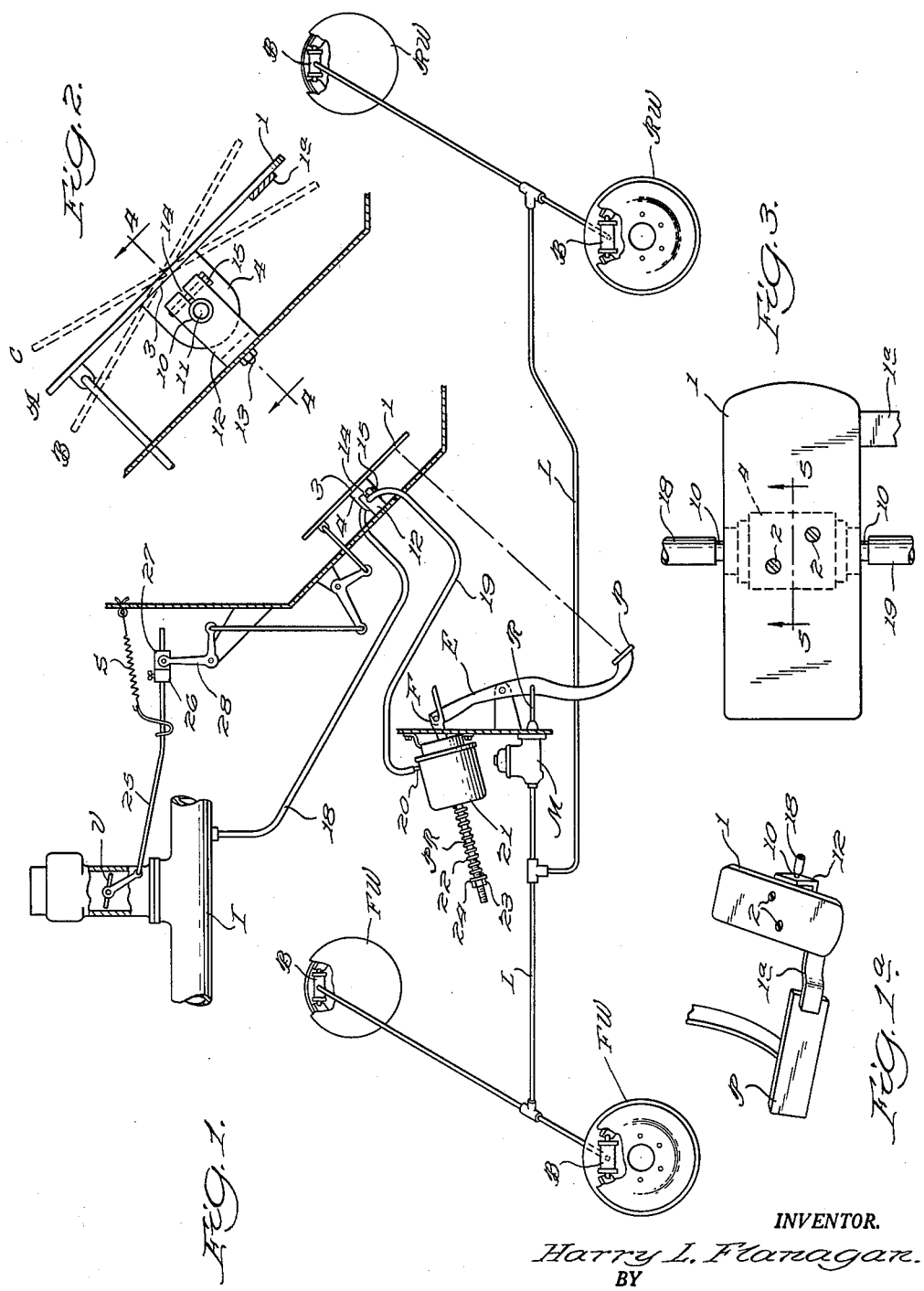
INVENTOR.
Harry L. Flanagan.
BY
Harold J. LeVescoute
Atty.

Aug. 27, 1963 H. L. FLANAGAN 3,101,823
VEHICLE BRAKE OPERATING MEANS
Filed Oct. 31, 1961 2 Sheets-Sheet 2
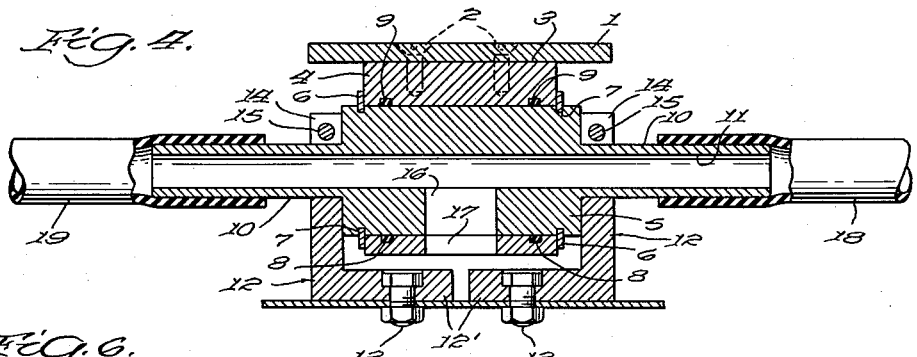
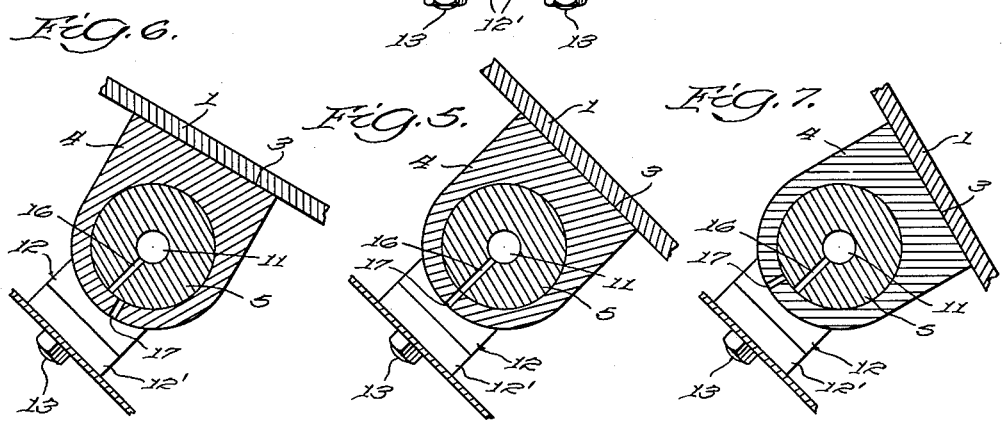
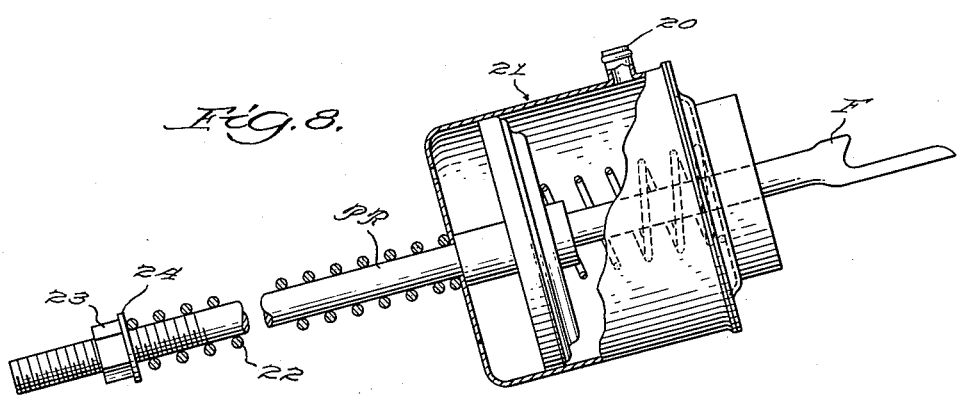
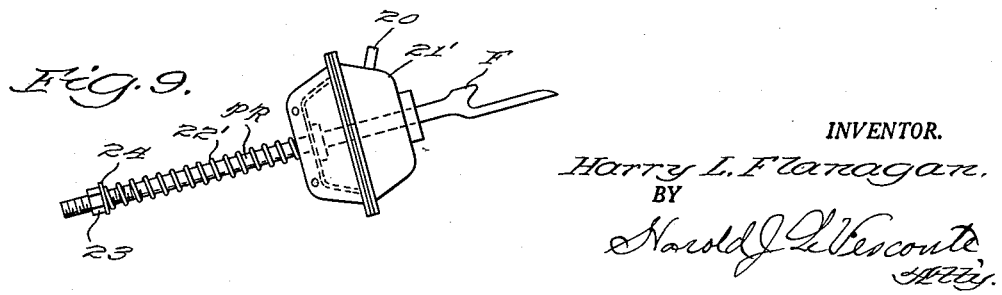
INVENTOR.
Harry L. Flanagan,
BY
Harold J. LeVescoute
Atty.

United States Patent Office 3,101,823
Patented Aug. 27, 1963

3,101,823
VEHICLE BRAKE OPERATING MEANS
Harry L. Flanagan, Coral Gables, Fla.
(7939 Reseda Blvd., Reseda, Calif.)
Filed Oct. 31, 1961, Ser. No. 149,077
12 Claims. (Cl. 192—3)

This invention relates to vacuum operated vehicle service brake actuating means and more particularly to an improved, single pedal control for both the brake actuating means and the engine throttle.

The principal object of the invention is to combine a vacuum controlling valve means with the throttle pedal and a service brake actuating vacuum cylinder means operatively connected to said valve means together with means restraining the vacuum cylinder from actuating the brakes in response to vacuum of less than a predetermined value.

Another object of the invention is to provide a vacuum controlling valve means for a vacuum actuated vehicle service brake system in which the said valve means constitutes the hinge or pivot for the throttle pedal of the vehicle.

A further object of the invention is to provide a vacuum actuated service brake system for vehicles in which the vacuum actuating cylinder is rendered operative only in response to vacuum in excess of a predetermined value.

Still another object of the invention is to provide a brake actuating system for vehicle service brakes in which the foregoing objectives are realized in practice and which, in addition, is capable of application to existing vehicle brake systems while preserving the capability of independent manual operation of the brakes at will.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a schematic or diagrammatic view of a vehicle service brake system having a presently preferred embodiment of the invention applied thereto, FIG. 1a is an enlarged scale, perspective view of the interconnection between the throttle and foot brake pedals which is indicated by a dot and dash line in FIG. 1, FIG. 2 is a greatly enlarged, side elevational view of the combined throttle and vacuum control pedal, FIG. 3 is a top plan view of the pedal shown in FIG. 2, FIG. 4 is an enlarged scale, medial sectional view taken on the line 4—4 of FIG. 2, FIGS. 5, 6 and 7 are fragmentary transverse sectional views on the same scale as FIG. 4 taken on the line 5—5 of FIG. 3 and showing the relation of the vacuum breaking port means associated with the pedal when the pedal is in the positions indicated on FIG. 2 as A, B, and C, respectively, FIG. 8 shows a piston type vacuum responsive brake actuator employable with the invention, and FIG. 9 is a side elevational view, in reduced scale of a diaphragm type of vacuum responsive actuator employable in the invention as a substitute or alternative for the piston type actuator shown in FIGS. 1 and 8.

Referring first to FIG. 1 there is shown schematically the associated components of the present invention with the service braking system of a vehicle; said system other than the components of the present invention comprising a master cylinder M having a piston rod R operatively connected to a foot pedal P. Fluid conducting lines L connect the master cylinder with the brake cylinder B of the front wheel brakes FW and rear wheel brakes RW. The illustrated system includes vacuum power means including a vacuum responsive cylinder having a piston rod PR terminating in a forked end F adapted to engage an extension E of the brake pedal P. Vacuum for the brake actuator is obtained from the engine intake manifold I through a vacuum line which is interrupted intermediate the manifold and brake cylinder by certain valve means forming a component of the present invention and the engine throttle valve V is connected by a system of links and bell cranks to the toe end of the combined throttle and brake operating pedal of the present invention. A spring S serves to bias the throttle valve linkage and pedal in a direction tending to close the throttle valve and said linkage also includes a lost motion connection, presently to be described, which enables the combined throttle and brake pedal to perform the brake actuating function. Thus far, the described apparatus follows generally the pattern of many vacuum operated brake actuating devices. The present invention relates to the novel means for controlling the application of vacuum to the brake actuating vacuum cylinder and in the means for limiting the range of vacuum thus made available for brake actuating purposes.

The combined throttle and brake pedal 1 of the present invention is secured in any suitable manner as by screws 2 to a flattened side 3 of a sleeve 4 which is freely mounted for oscillation on a cylindrical support 5. Snap rings 6, 6 engaging peripheral grooves 7, 7 adjacent opposite ends of the cylindrical support 5 engage the opposite end faces of the sleeve 4 to hold the sleeve against endwise movement and O-ring gaskets 8, 8 located in grooves 9, 9 adjacent opposite ends of the interior surface of the sleeve 4 engage and form sealing contact with the outer surface of the support 5.

The support 5 is reduced in diameter at each end thereof to form hose nipple ends 10, 10 and an axial bore 11 extends through the support and the nipple components thereof. The nipple components extend through bracket members 12, 12 provided with foot portions 12', 12' which are secured to the floorboard of the vehicle by bolts 13, 13 and the hole in each bracket through which one each of the nipple components 10, 10 extends is provided with a radial slot 14 to permit a clamp screw 15 to grip the nipple components and thus secure the support member 5 in a desired rotative position relative to rocking movement of the pedal and the sleeve 4 on which the pedal is mounted as will be presently described.

The support member 5 intermediate its ends is provided with a longitudinally narrow, radially extending slot constituting a port 16 extending from the bore 11 to the outer surface thereof and the sleeve 4 is provided with a complementary slot constituting a port 17 which, when the pedal 1 is moved to its intermediate or "A" position as shown in full lines in FIG. 2, is in registry with the slot 16 as shown in FIGS. 3 and 5.

A hose or equivalent conduit 18 connects the engine intake manifold I with one of the hose nipples 10 and a second hose or the like 19 connects the other nipple 10 with the nipple 20 on the vacuum responsive brake operating cylinder 21. This vacuum cylinder is generally like all vacuum responsive brake operating cylinders except for the fact that it is preferably slightly larger in diameter and in that the piston rod PR thereof is additionally biased against vacuum responsive movement by a compression spring 22 surrounding the piston rod. A nut 23 threaded on the piston rod and supporting the washer 24 engages one end of the spring and provides an adjustable abutment whereby the initial bias of the spring as compressed between the washer 24 and the end of the vacuum cylinder may be adjusted to a desired amount.

It will be noted particularly in FIGS. 5, 6 and 7 that when the pedal 1 is in its intermediate or "A" position, the ports 16 and 17 are in registry and therefore the vacuum will be broken since air will be drawn in through these ports into the vacuum line. When, however, the pedal is moved away from the "A" position to the "B" or the "C" positions, these ports are out of registry with each other and vacuum being created in the manifold is communicated to the cylinder 21. While the vehicle is in the driving range, as between the pedal positions "A" and "B," the throttle valve V is opened to some desired extent and therefore the vacuum will be less than when the throttle valve is completely closed and the motor is being operated by the car as under conditions of coasting down a grade or coasting to a stop. The spring 22 is adjusted so that the vacuum cylinder 21 is incapable of operating under the vacuum deriving from normal driving conditions with the throttle V at least partly open. When, however, it is desired to apply the brakes to the vehicle and the pedal 1 is brought past the "A" position toward the "C" position very quickly, there will be, of course, a slight momentary breaking of the vacuum as the port 17 moves from the "B" position to the "C" position but the time element (a fraction of a second) is so slight as to be inconsequential. Under these conditions, the vehicle is rolling forward and causing the motor to turn over at a high rate of speed and a very high vacuum is produced in the manifold and hence in the lines 18 and 19, thus causing the vacuum cylinder to operate in opposition to the bias of the spring 22 and actuate the pedal P with resultant brake actuation. Attention is directed to the fact that this is accomplished quickly and that the very valuable small fraction of a second for the reaction of the driver is reduced to a minimum so that the distance traveled by the vehicle from the instant of noting the emergency and the time of bringing the vehicle to a stop is greatly reduced.

For normal driving procedures such as rolling up to a stoplight or stop sign, the pedal 1 is moved to the "A" position allowing the vacuum to be broken and thus relieving any strain on the idler jets of the carburetor and preventing the drawing of excessive fuel into the engine. As the stop is being approached the pedal can be moved toward the "C" position with resultant actuation of the cylinder 21 and of bringing the car to a stop.

In this connection where a slight braking action is desired before the vacuum braking becomes fully effective, it will be noted that the brake pedal 1 is provided with a laterally extending arm 1a which extends over the front of the pad of the brake pedal P so that the initial stages of the movement of the pedal 1 from the "A" position toward the "C" position will effect a slight amount of manual braking action if desired.

There are means to be described, the means by which the pedal 1 has capacity for movement between the "A" and "C" positions in a braking operation. In the throttle valve linkage, the spring S tends normally to move the valve V to a closed position as determined by a stop means (not shown) but which is present in all carburetor throttle valves; said linkage including a rod 25 connected to the valve operating arm and to which one end of the spring S is also connected. This rod carries a stop collar 26 adjacent the end thereof opposite the valve connected end and slidably mounted on the said end of the rod 25 beyond the stop collar 26 is a collar 27 connected to one end of a bell crank 28 which, in turn, through suitable linkage, is operatively connected to the toe end of the pedal 1. When the pedal is at the "A" position, the collar 27 is engaging the stop collar 26 and as the pedal moves toward the "B" position, this engagement moves the rod 25 to the left as viewed in FIG. 1 with resultant opening of the valve V. In a braking operation, the spring S causes the rod and stop collar to follow the retreating collar 27 until the pedal reaches the "A" position, after which, continued movement of the pedal toward the "C" position serves only to move the collar 27 along the rod 25 away from the collar 26. As the braking operation is completed and the pedal returns to the "A" position, the two collars 26 and 27 come into engagement with each other again.

The diaphragm type of actuator 21' shown in FIG. 9 is disclosed merely to indicate that the brake actuator need not be a piston type and can be a diaphragm type of actuator. It would, of course, be equipped with a biasing spring 22' to prevent operation at lower than some predetermined value of vacuum.

Thus there has been created a control means for a brake actuating apparatus as well as a vehicle brake actuator which operates by intake manifold vacuum but which operates on the brakes only when the vacuum is in excess of a predetermined figure such as would occur when the motor is operating at considerable speed and the throttle valve is closed.

While in the foregoing specification there has been disclosed certain presently preferred embodiments of the invention, the invention is not to be deemed to be limited to the precise details of construction thus disclosed by way of example, and it will be understood that the invention includes as well all such changes and modifications in the parts and in the construction, combination and arrangement of parts as shall come within the purview of the appended claims.

I claim:

1. A service brake control means for a motor vehicle having an engine controlled by a throttle valve and having a service brake system including a master cylinder; said control means including a vacuum responsive cylinder having a vacuum responsive reciprocable element operatively connected to the brake system master cylinder, conduit means connecting said vacuum cylinder with a source of vacuum associated with the vehicle engine, and manually operable control means for varying the extent of vacuum imposed on said vacuum responsive cylinder comprising an oscillatable foot pedal operatively connected to the engine throttle valve and a vacuum controlling valve means interposed in said conduit means and operatively associated with said foot pedal; said valve means including port means comprising a pair of cooperating ports which during traverse of said foot pedal through a predetermined portion of its path of movement, are brought into registry with each other to connect the interior of said conduit means with atmosphere with resultant disabling of said conduit means and said vacuum responsive cylinder to actuate the service brake system while said feet pedal is moving within said portion of its path of movement and in which said pair of ports are moved out of registry with each other during traverse of said foot pedal through another portion of its path of movement with resultant actuation of the service brake system by the imposition of vacuum on said vacuum responsive cylinder.

2. A brake control means as claimed in claim 1 in which said ports are disposed out of registry with each other while the engine throttle is maintained in open position by said foot pedal.

3. A brake control means as claimed in claim 1 in which said ports are disposed out of registry with each other with resultant vacuum actuation of the vehicle brakes when the throttle valve is closed by said foot pedal.

4. A brake control means as claimed in claim 1 in which said foot pedal is connected to the engine controlling throttle valve by means including lost motion devices effective to permit continued movement by said pedal in the direction of throttle valve closing after closing of the throttle valve and in which said port means is moved to open position for admission of air and breaking of the vacuum in said vacuum line through a limited portion of said continued movement immediately following the closing of the engine throttle valve.

5. A brake control means as claimed in claim 1 in which said vacuum responsive cylinder includes a piston, a piston rod and spring means yieldingly opposing vacuum operation of the piston and piston rod of said cylinder; the force exerted by said spring means being of sufficient magnitude to resist actuation of said piston and piston rod in response to vacuum imposed thereon at any time when the engine throttle valve is open.

6. A brake control means as claimed in claim 1 in which the vehicle includes a brake operating foot pedal and in which said throttle operating foot pedal is disposed closely adjacent to the brake operating pedal of the vehicle and includes a lug member overlying the brake operating foot pedal effective to cause brake actuation by said brake actuating foot pedal through motion of said throttle connected pedal prior to initiation of vacuum operation of the vehicle brakes.

7. A brake control means as claimed in claim 1 in which said valve means associated with said foot pedal additionally constitutes the pivotal support for said associated pedal.

8. A controlling valve means for motor vehicle service brakes powered by a vacuum responsive cylinder; said valve means comprising a pedal operatively connected to the throttle valve controlling the vehicle engine by means including a lost motion connection operative to permit continued movement of the pedal in the direction of throttle closing beyond the point of movement thereof at which throttle closure is effected; said valve means comprising a hollow, cylindrical body, bracket means mounted on the vehicle floorboard supporting said body in a horizontal position transversely of the vehicle and spaced from the floorboard; the hollow interior of said body being interposed in and forming a part of a vacuum line extending from a source of vacuum associated with the engine to said vacuum responsive brake operating cylinder, a sleeve member mounted for oscillation on said body member, means securing said sleeve against endwise movement on said body member, means securing said pedal to said sleeve member for oscillatory movement therewith, a port in said body member extending from the hollow interior thereof to the external cylindrical surface thereof and a corresponding port extending through said sleeve adapted to be brought into registry with said first named port during an intermediate portion only of the path of travel of said pedal in its said oscillatory movement.

9. A vacuum operated vehicle brake controlling valve means as claimed in claim 8 in which said ports are so positioned as to be out of registry with each other when the engine throttle valve is opened by movement of said foot pedal beyond said intermediate portion of said path of travel.

10. A vacuum operated vehicle brake controlling valve means as claimed in claim 8 in which said ports are so positioned as to be out of registry with each other when vacuum actuated brake operation is being effected by movement of said foot pedal closing the engine throttle valve.

11. A vacuum operated vehicle brake controlling valve means as claimed in claim 8 in which said ports are so positioned as to be brought into registry only when the throttle valve is closed and before vacuum brake operation is initiated by said pedal.

12. A vacuum operated vehicle brake controlling valve means as claimed in claim 8 in which said hollow, cylindrical body member is mounted on said bracket means for rotative adjustment for bringing said ports into registry with each other at a predetermined pivotal position of said pedal.

References Cited in the file of this patent

UNITED STATES PATENTS

| | | |
|---|---|---|
| 2,126,849 | Weiss | Aug. 16, 1938 |
| 2,842,239 | Banker | July 8, 1958 |